US012596135B2

(12) United States Patent
Carter

(10) Patent No.: US 12,596,135 B2
(45) Date of Patent: *Apr. 7, 2026

(54) WHEEL CAPABLE OF DETECTING DIRECTION OF ROTATION

(71) Applicant: Gatekeeper Systems, Inc., Foothill Ranch, CA (US)

(72) Inventor: Scott J. Carter, Seal Beach, CA (US)

(73) Assignee: Gatekeeper Systems, Inc., Foothill Ranch, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/752,102

(22) Filed: Jun. 24, 2024

(65) Prior Publication Data

US 2024/0426863 A1 Dec. 26, 2024

Related U.S. Application Data

(63) Continuation of application No. 17/932,578, filed on Sep. 15, 2022, now Pat. No. 12,044,696.

(Continued)

(51) Int. Cl.
| | |
|---|---|
| *G01P 13/04* | (2006.01) |
| *G01B 7/14* | (2006.01) |
| *G01B 7/30* | (2006.01) |

(52) U.S. Cl.
CPC .............. *G01P 13/04* (2013.01); *G01B 7/14* (2013.01); *G01B 7/30* (2013.01)

(58) Field of Classification Search
CPC .............. G01P 13/04; G01B 7/14; G01B 7/30
See application file for complete search history.

(56) References Cited

U.S. PATENT DOCUMENTS

| | | | |
|---|---|---|---|
| 5,883,968 A | 3/1999 | Welch et al. | |
| 6,084,400 A | 7/2000 | Steinich et al. | |

(Continued)

FOREIGN PATENT DOCUMENTS

| | | | | |
|---|---|---|---|---|
| DE | 102010008692 A1 * | 8/2011 | ......... | B60B 33/0073 |
| DE | 10 2018 211216 A1 | 1/2020 | | |

OTHER PUBLICATIONS

International Search Report and Written Opinion in corresponding International Patent Application No. PCT/US2022/076455, dated Dec. 14, 2022 in 19 pages.

*Primary Examiner* — Judy Nguyen
*Assistant Examiner* — Adam S Clarke
(74) *Attorney, Agent, or Firm* — Knobbe, Martens, Olson & Bear, LLP

(57) ABSTRACT

A wheel or wheel assembly for a non-motorized vehicle, such as a shopping cart, is disclosed that detects its direction of rotation. In one embodiment, the wheel assembly includes a plurality of magnets mounted to a rotating portion of the wheel, and includes a magnetic sensor, such as a tunneling magnetoresistance sensor, mounted to a non-rotating portion. As the wheel rotates the magnets produce a varying magnetic field that is sensed by the sensor, which outputs a signal corresponding to the sensed magnetic field. The magnets are arranged—preferably asymmetrically—such that the sensor's output signal differs depending upon whether the wheel is rotating in the clockwise versus counterclockwise direction. A controller analyzes the sensor's output signal to determine the direction of rotation. In another embodiment, the magnets are replaced by conductive targets, and an eddy current sensor is used for the magnetic sensor.

18 Claims, 7 Drawing Sheets

Related U.S. Application Data

(60) Provisional application No. 63/245,158, filed on Sep. 16, 2021.

(56) References Cited

U.S. PATENT DOCUMENTS

| | | | |
|---|---|---|---|
| 6,498,474 | B1 | 12/2002 | Turner |
| 6,857,975 | B2 * | 2/2005 | Kitamura ............... B62M 25/08 |
| | | | 474/70 |
| 7,392,119 | B2 | 6/2008 | Allard et al. |
| 7,411,388 | B2 * | 8/2008 | Sagoo ................. G01D 5/2033 |
| | | | 324/207.25 |
| 8,463,540 | B2 | 6/2013 | Hannah et al. |
| 9,243,918 | B2 | 1/2016 | Goldman et al. |
| 9,845,072 | B1 | 12/2017 | Carter et al. |
| 10,232,869 | B2 | 3/2019 | Carter et al. |
| 2009/0295376 | A1 | 12/2009 | Vu et al. |
| 2013/0015845 | A1 | 1/2013 | Fox |
| 2014/0176125 | A1 | 6/2014 | Friedrich et al. |
| 2015/0015245 | A1 | 1/2015 | Inoue et al. |
| 2015/0233736 | A1 | 8/2015 | Habenschaden |
| 2016/0209476 | A1 | 7/2016 | Feucht et al. |
| 2017/0059526 | A1 | 3/2017 | Grambichler et al. |
| 2019/0025082 | A1 | 1/2019 | Kerdraon et al. |
| 2019/0125046 | A1 | 5/2019 | Qi et al. |
| 2019/0277874 | A1 | 9/2019 | Hainz et al. |
| 2019/0368902 | A1 | 12/2019 | Utermoehlen et al. |
| 2020/0079412 | A1 | 3/2020 | Ramanathan et al. |
| 2020/0209017 | A1 | 7/2020 | Eagen et al. |
| 2020/0225058 | A1 | 7/2020 | Ramos de Almeida et al. |

* cited by examiner

WHEEL CAPABLE OF DETECTING DIRECTION OF ROTATION

RELATED APPLICATIONS

This application is a continuation of U.S. patent application Ser. No. 17/932,578, filed Sep. 15, 2022, which claims the benefit of U.S. Provisional Appl. No. 63/245,158, filed Sep. 16, 2021, the disclosure of which is hereby incorporated by reference.

BACKGROUND

A problem encountered in the wheels of certain vehicles, such as non-motorized vehicles (e.g., shopping carts), relates to determining the direction of rotation of the wheel (also called a "wheel assembly"). For a non-castered wheel on shopping cart, this means forward or backward. Knowing the direction of rotation can be beneficial in anti-theft, cart control, dead reckoning, and other systems and applications, such as those disclosed in U.S. Pat. Nos. 8,463,540, 9,731, 744, 10,232,869 and 11,208,134, and U.S. Patent Application Publication No. 2020/0079412, each of which is hereby incorporated by reference herein.

SUMMARY

A wheel or wheel assembly for a non-motorized vehicle, such as a shopping cart, is disclosed that detects its direction of rotation. In one embodiment, the wheel includes a plurality of magnets that are mounted to a rotating portion of the wheel, and includes a magnetic sensor, such as a tunneling magnetoresistance sensor, mounted to a non-rotating portion. As the wheel rotates the movement of the magnets produces a time varying magnetic field that is sensed by the magnetic sensor, which outputs a signal that corresponds to the sensed magnetic field. The magnets are arranged—preferably in a rotationally asymmetric arrangement—such that the sensor's output signal differs in a measurable and distinguishable way depending upon whether the wheel is rotating in the clockwise versus counterclockwise direction. A controller of the wheel or wheel assembly analyzes the sensor's output signal to determine the direction of rotation. In another embodiment, the magnets are replaced by conductive targets, and an eddy current sensor is used for the magnetic sensor.

One aspect of the invention is thus a wheel assembly comprising: a wheel having mounted thereon a plurality of magnets; a magnetic sensor mounted to a non-rotating portion of the wheel assembly such that the magnets pass by the magnetic sensor as the wheel rotates, the magnetic sensor configured to generate an output signal corresponding to a sensed magnet field; and a controller configured to determine, based on the output signal, a direction of rotation of the wheel. The magnets may be arranged on the wheel in a rotationally asymmetric arrangement. One of the magnets may have a north pole pointed radially inward, and another magnet may have a north pole pointed radially outward. The magnetic sensor may be a tunneling magnetoresistance (TMR) sensor. The TMR sensor may operate as a binary switch that switches between two output levels, in which case the controller may be configured to determine the direction of rotation based on timings of transitions between the two output levels. In some embodiments, the TMR sensor outputs an analog signal representing a sensed magnetic field, and the controller analyzes a digitized representation of the analog signal to determine the direction of rotation.

Another aspect of the invention is a method of sensing a direction of rotation of a wheel of a human-propelled vehicle, wherein the wheel comprises a rotating portion having a plurality of magnets mounted thereon. The method comprises: generating, with a magnetic sensor mounted to a non-rotating portion of the wheel, a signal representing a varying magnetic field produced by movement of the magnets relative to the magnetic sensor as the wheel rotates; and, by a controller coupled to the magnetic sensor, sensing the direction of rotation of the wheel by analyzing said signal.

Another aspect of the invention is a wheel assembly comprising: a wheel having mounted thereon a plurality of conductive targets; a magnetic sensor mounted to a non-rotating portion of the wheel assembly such that the conductive targets pass by the magnetic sensor as the wheel rotates, the magnetic sensor configured to generate an output signal that varies in response to movement of the conductive targets past the magnetic sensor; and a controller configured to determine, based on the output signal, a direction of rotation of the wheel. The conductive targets may be arranged asymmetrically on the wheel. The magnetic sensor may be an eddy current sensor. The eddy current sensor may operate as a binary switch that switches between two output levels, in which case the controller may be configured to determine the direction of rotation based on timings of transitions between the two output levels.

Another aspect of the invention is a method of sensing a direction of rotation of a wheel of a human-propelled vehicle, wherein the wheel comprises a rotating portion having a plurality of conductive targets mounted thereon. The method comprises: generating, with a magnetic sensor mounted to a non-rotating portion, a signal representing movement of the conductive targets relative to the magnetic sensor as the wheel rotates; and, by a controller coupled to the magnetic sensor, sensing said direction of rotation of the wheel by analyzing said signal. The magnetic sensor may be an eddy current sensor.

Another aspect of the invention is a wheel assembly comprising: a wheel having mounted thereon a plurality of objects, and a magnetic sensor mounted to a non-rotating portion of the wheel assembly such that the objects pass by the magnetic sensor as the wheel rotates. The objects induce a response in the magnetic sensor as the wheel rotates, causing the magnetic sensor to generate a time varying output signal that differs depending upon whether the wheel is rotating in a clockwise versus counterclockwise direction. A controller analyzes the output signal to determine the direction of rotation. In one embodiment, the objects are magnets, and the magnetic sensor is a tunneling magnetoresistance (TMR) sensor. In another embodiment, the objects are conductive targets, and the magnetic sensor is an eddy current sensor. The objects are preferably arranged in a rotationally asymmetric arrangement on the wheel.

DETAILED DESCRIPTION OF SPECIFIC EMBODIMENTS

Specific embodiments will now be described with reference to the drawings. These embodiments are intended to illustrate, and not limit, the invention. Although the invention is described in the context of a shopping cart wheel, as will be apparent, the invention is also applicable to other types of human-propelled carts and vehicles, such as luggage carts, medical equipment carts, and hospital beds.

Figure 1:
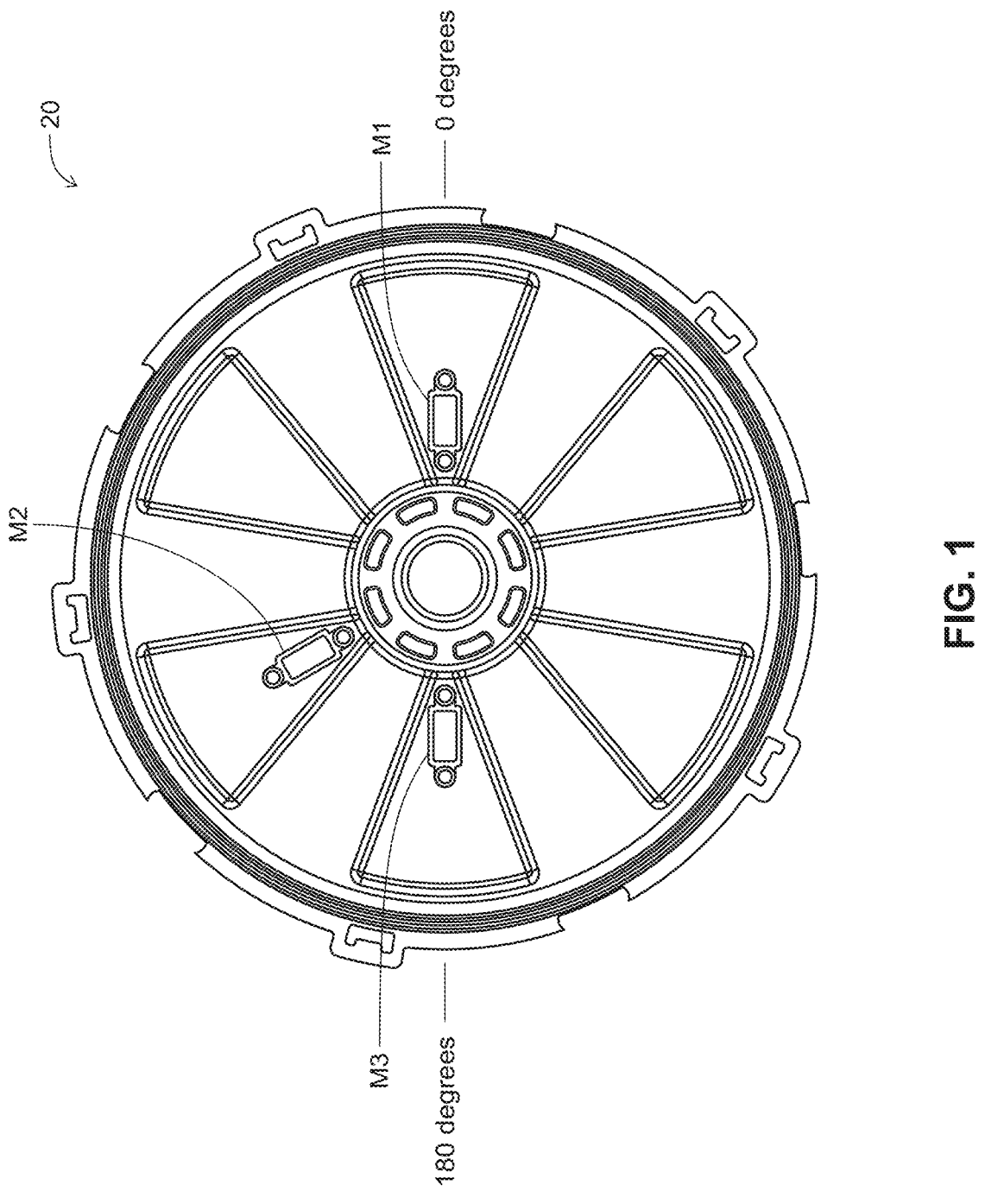
FIG. 1 illustrates a shopping cart wheel with asymmetrically positioned magnets for detecting the wheel's direction of rotation according to one embodiment.
Figure 2:
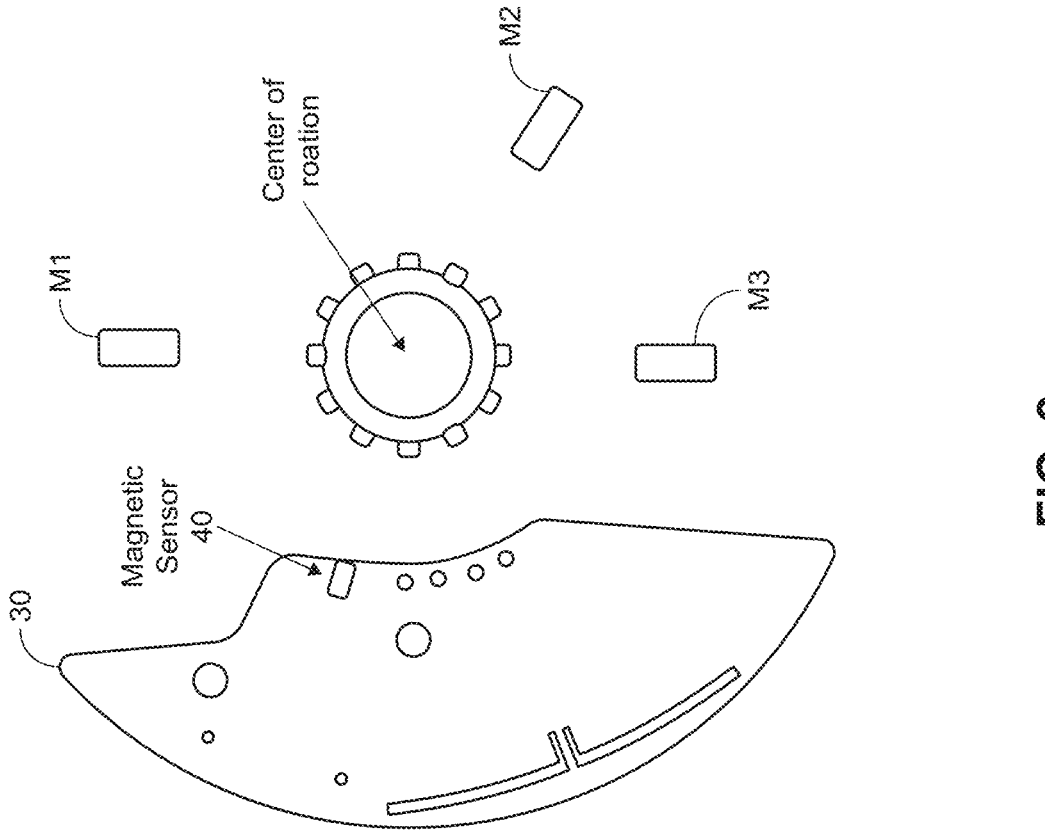
FIG. 2 illustrates selected components of the wheel of FIG. 1 (as viewed from the opposite side of the wheel), including the magnets and a tunneling magnetoresistance (TMR) switch.

FIGS. 1 and 2 illustrate a shopping cart wheel 20 capable of determining its direction of rotation according to one embodiment. The wheel 20 includes three magnets, labeled M1, M2 and M3, mounted to a rotating portion of the wheel, such as the wheel's case, cover or tread. The magnets may be housed within the wheel so that they are not visible from outside the wheel. Magnets M1 and M3 are mounted at 0 degrees and 180 degrees, respectively, and magnet M2 is mounted at 240 degrees. The magnets are positioned equidistant from the wheel's center, with the north poles of magnets M1 and M3 pointed radially outward and the north pole of M2 pointed radially inward. The wheel may have a diameter of approximately 5 inches, as is standard for shopping carts, and may be part of a non-castered wheel assembly for attaching to a shopping cart frame (typically as a rear wheel).

As will be apparent, the number magnets can be varied; for example, the number of magnets can be two, four, five, six or more. Preferably, the magnets are positioned asymmetrically, although embodiments with symmetric positioning are possible. As will be apparent, any arrangement of magnets can be used that produces a magnetic field that varies in a measurable and distinguishable way depending on the wheel's direction of rotation. Further, as described below, in some embodiments the magnets can be replaced with conductive targets.

As shown in FIG. 2 (which shows the wheel as viewed from the opposite side comparted to FIG. 1), the wheel 20 includes a printed circuit board 30 that does not rotate. The printed circuit board is housed within the wheel and includes, among other components not shown in FIG. 1, a magnetic sensor 40, such as a tunneling magnetoresistance (TMR) sensor, that senses the magnetic fields produced by the magnets M1-M3. In the primary embodiment described herein, the magnetic sensor 40 is a TMR sensor that operates as a binary switch, and is therefore also referred to herein as a TMR switch. The magnetic sensor 40 may alternatively be mounted external to the wheel, such as to a wheel cover or guard that is part of a wheel assembly that attaches to a shopping cart. The magnetic sensor 40 is positioned approximately the same distance from the wheel's center as the magnets, such that the magnets pass over the sensor 40 as the wheel rotates. As described below, in other embodiments the magnets M1-M3 may be replaced with small, conductive objects such as pieces of metal, in which case an eddy current sensor may be used for the magnetic sensor 40.

Figure 3:
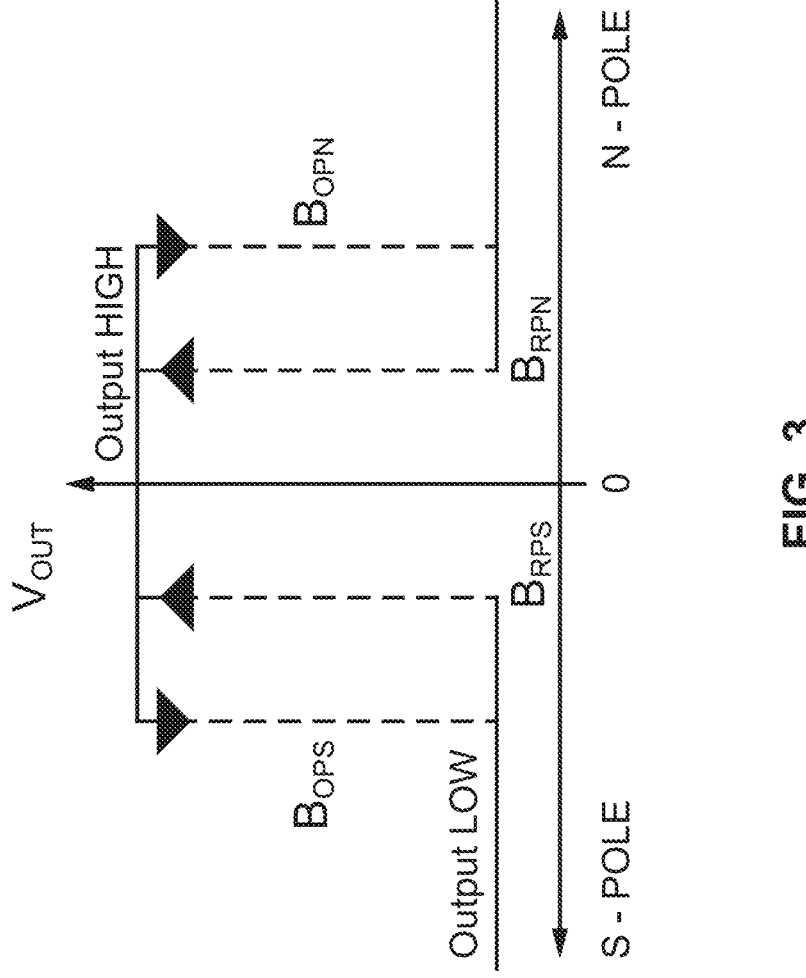
FIG. 3 illustrates the output response versus magnetic flux graph for a commercially available TMR switch that may be used in the wheel of FIGS. 1 and 2.

One example of a commercially available TMR sensor/switch 40 that may be used is the RR122 TMR Digital Push-Pull Magnetic Sensor from Coto™ Technology. The output response versus magnetic flux graph for the RR122 is shown in FIG. 3. As discussed below, a TMR sensor that outputs an analog signal may also be used.

Figure 4:
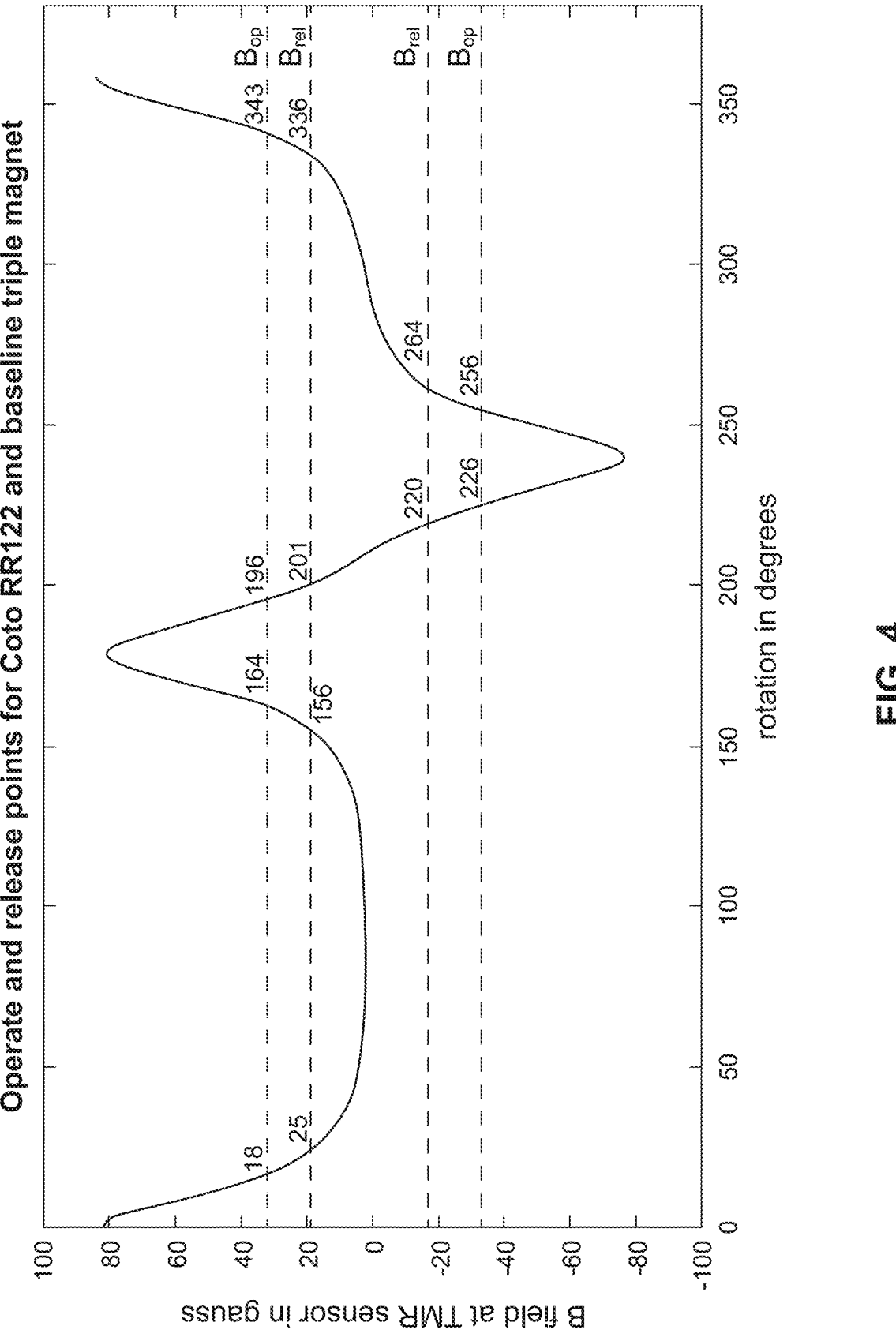
FIG. 4 illustrates, for the arrangement of FIGS. 1 and 2 and TMR switch of FIG. 3, the magnetic field at the TMR switch as the wheel rotates in the clockwise direction, and illustrates the operate and release points, $B_{OP}$ and $B_{REL}$, at which the TMR switch transitions between its high (operate) output and low (release) output.

FIG. 4 illustrates the magnitude of the magnetic field (B) at the magnetic sensor 40 versus rotation angle during clockwise rotation of the wheel using magnets having a size of 1.25 mm×3.05 mm×7.1 mm and made from n52 material. The numbers shown along the graph represent the angular positions at which the operate and release points of the RR122 TMR sensor 40 are reached. The two positive peaks in the graph correspond to the angular positions at which magnets M1 and M3 pass the TMR sensor 40. The dip at approximately 240 degrees corresponds to the angular position at which M2 (the magnet with its north pole facing inward) passes the TMR sensor.

Figure 5:
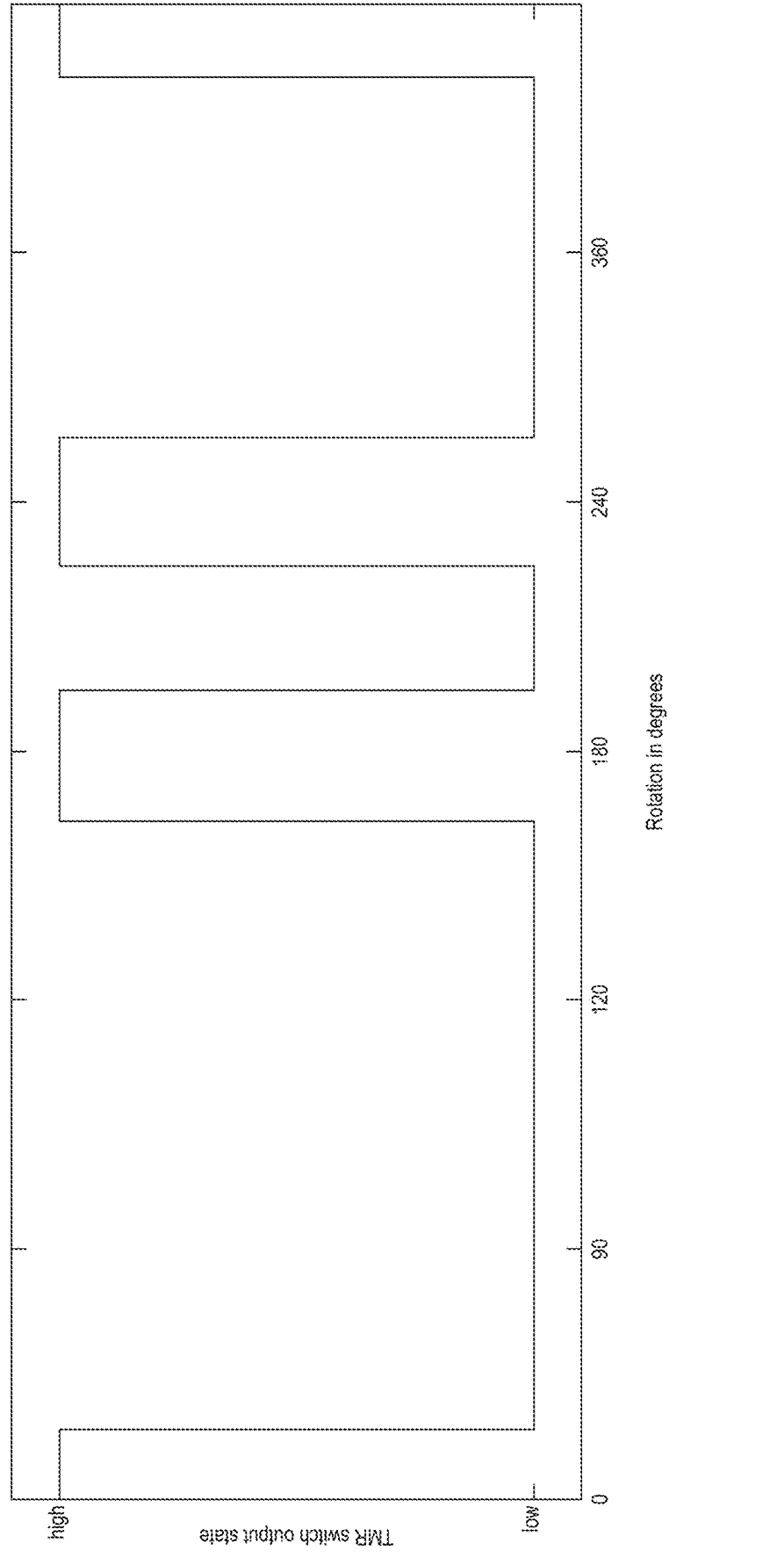
FIG. 5 illustrates the output of the TMR switch as the wheel rotates in the clockwise direction.

FIG. 5 illustrates the output of the TMR switch or sensor 40 versus angular position during clockwise rotation. The positive to negative transitions occur at approximately 17 degrees, 195 degrees and 256 degrees, and the negative to positive transitions occur at approximately 163 degrees, 226 degrees and 343 degrees. As this graph illustrates, the output during one rotation of the wheel 20 has three intervals during which the output is low, and these intervals differ in width: the first is relatively long (about 146 degrees), the second is relatively short (about 31 degrees), and the third is of medium width (about 86 degrees). This pattern (short-medium-long-short . . . ) is reversed when the wheel rotates in the counterclockwise direction: specifically, the low-output intervals follow the pattern short-long-medium-short . . . during counterclockwise rotation. Thus, the pattern is indicative of the direction of rotation.

Because of the inertia of the shopping cart (or other human-propelled cart), the rotation speed of the wheel ordinarily does not change significantly (e.g., by more than 10%) during a single rotation when the cart is in motion. Thus, the wheel's direction of rotation can be determined with reasonable accuracy by measuring and comparing the relative durations of the time intervals during which the output is low. Specifically, if the relative time durations follow the pattern short-medium-long-short, the wheel can be determined to be rotating clockwise, and if they follow the pattern short-long-medium-short, the wheel can be determined to be rotating counterclockwise. To account for part variances and changes in wheel speed, the relative durations of the negative intervals may be analyzed using an algorithm that does not require an exact match with the relative durations shown in FIG. 5.

As will be apparent from the foregoing, in other embodiments, any arrangement and/or number of magnets can be used that causes the output of the magnetic sensor 40 to follow a pattern that differs in a distinguishable way depending on the wheel's direction of rotation. Thus, the particular 3-magnet arrangement shown in FIGS. 1 and 2 is merely one of many possible arrangements.

Figure 6:
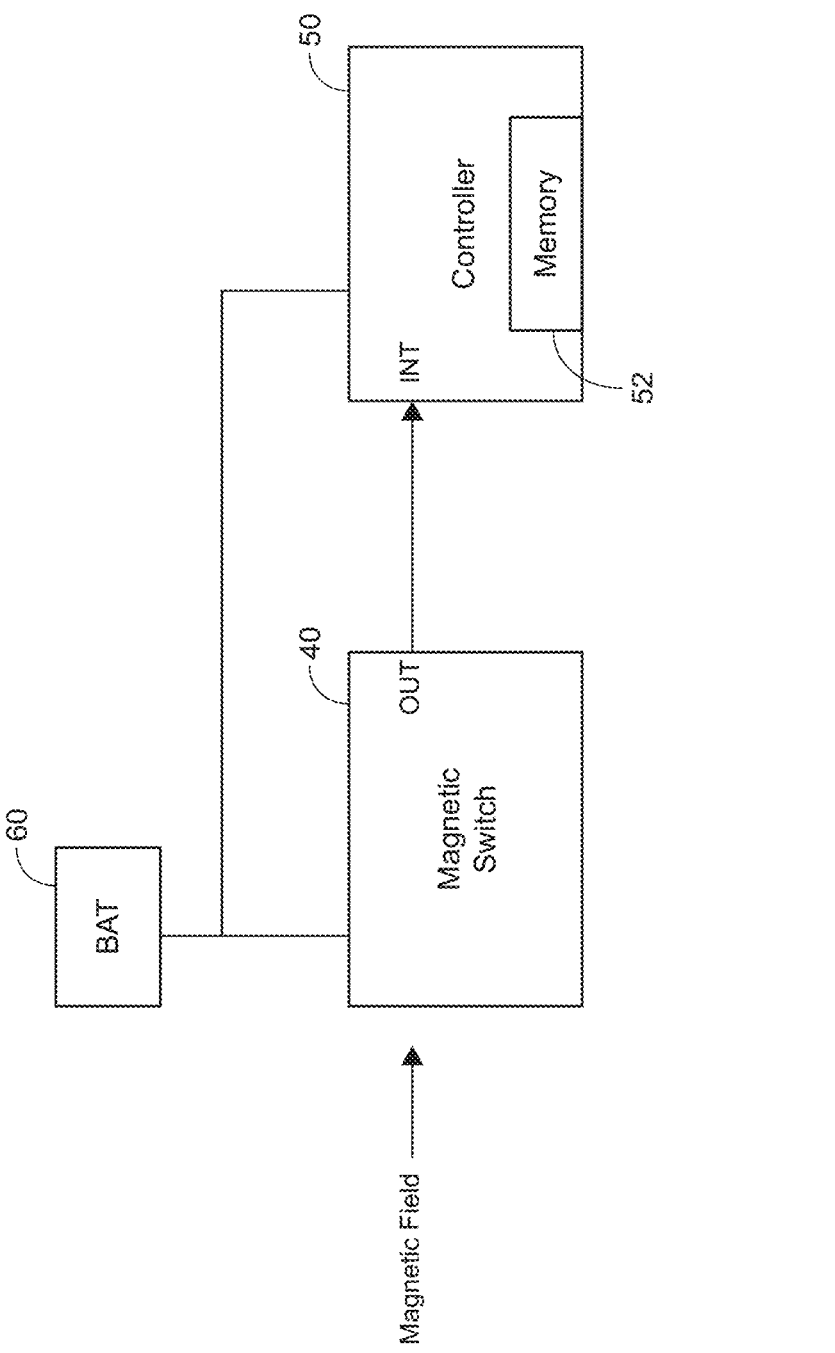
FIG. 6 illustrates the interconnection of the TMR switch to a controller that is programmed or otherwise configured to determine the wheel's direction of rotation.

FIG. 6 illustrates the interconnection between the magnetic (e.g., TMR) sensor 40 and a controller 50 configured to determine the wheel's direction of rotation. The controller

50 may, for example, be a microcontroller having an internal memory that stores firmware code, including code for implementing an algorithm for determining the direction of rotation. The controller 50 may alternatively be an application specific integrated circuit (ASIC), FPGA, or other type of logic device that does not execute program code, in which case the algorithm may be implemented in state machine logic. The magnetic sensor 40 and controller 50 are powered by a battery 60. The controller 50 and battery 60 may be mounted to the printed circuit board 30 (FIG. 2), along with various other electrical components commonly used in shopping cart monitoring applications (e.g., a radio frequency transceiver, a Very Low Frequency receiver, etc.).

In the illustrated example (in which the controller is assumed to be a programmed microcontroller and the magnetic sensor 40 is a TMR sensor/switch), the output of the magnetic sensor 40 is connected to an interrupt input pin of the controller 50, such that transitions in the output of the sensor 40 cause the controller to generate an interrupt. The microcontroller may be configured to generate interrupts in response to both positive edges and negative edges. In some embodiments, the controller 50 may operate in a low-power state most of the time and may wake up and execute an appropriate interrupt routine when an interrupt is generated. The controller 50 may also handle various other tasks unrelated to determining the wheel's rotation direction, such as the tasks described in the above-referenced patent documents.

Figure 7:
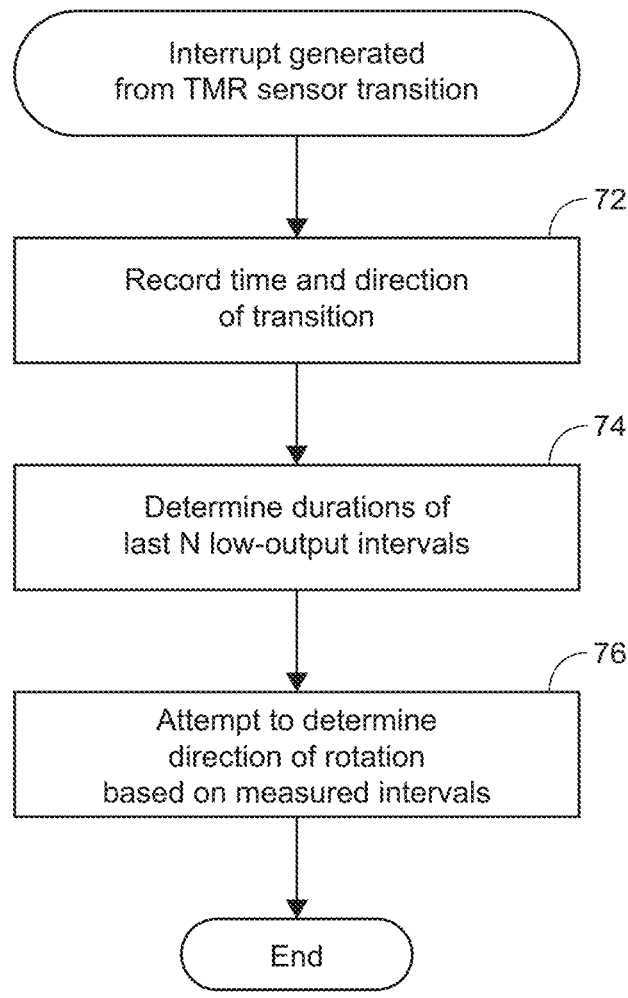
FIG. 7 illustrates an algorithm that may be used by the controller of FIG. 6 to determine the wheel's direction of rotation.

FIG. 7 illustrates an interrupt routine that may be executed by the controller 50 when either a positive or negative transition occurs in the output of the magnetic (TMR) sensor 40. In block 72, the controller 50 records in its memory the time and direction of the transition. In block 74, the controller 50 uses the recorded history of recent transitions to calculate the durations of each of the last N (e.g., 3, 4, 5 or 6) low-output intervals. In block 76, the controller uses these measurements to determine whether the intervals follow either the pattern for clockwise rotation or counterclockwise rotation. For purposes of this determination, the algorithm may be capable of determining the rotation direction provided that the wheel speed does not change by more than some threshold percentage (e.g., 10% or 20%) per rotation. In addition, if a negative-output interval exceeds a maximum threshold value (indicating that the cart is moving very slowly or had stopped) or falls below a minimum threshold value (indicating that the wheels is likely spinning too fast to be in contact with the ground), the algorithm may determine that the rotation direction cannot accurately be determined. The process shown in FIG. 7 can detect a change in the wheel's direction of rotation after approximately one full rotation. Although not illustrated in FIG. 7, the controller 50 may also use the timing of the transitions to measure the wheel's rotation speed.

The determined rotation direction may be used for a variety of purposes related to cart monitoring and control. For example, the direction of rotation, and thus the cart's direction of travel (forward versus backward), may be considered in making a programmatic determination of whether to perform an anti-theft action, such as a wheel locking or braking action as described in U.S. Pat. No. 8,463,540, and/or may be used by a dead reckoning algorithm and system to estimate a cart's location as disclosed in U.S. Pat. No. 10,232,869. One benefit of the embodiment of FIGS. 1-7 is that it consumes very little power, and is thus well suited for use in shopping cart monitoring applications and other applications in which the wheel's battery is expected to last for an extended period of time (e.g., several months to years).

In other embodiments, a TMR sensor 40 may be used that, in addition to outputting a two-level (binary) signal, outputs an analog representation of the sensed magnetic field (and more precisely, an analog representation of the projection of the magnetic field vector on the axis of sensitivity of the TMR sensor). The CT834 from Crocus™ Technology is one example of a sensor that outputs such an analog signal. When such a sensor 40 is used, an analog-to-digital converter may be used to convert the analog signal to a digital signal, which may be analyzed by the controller 50 to determine the direction of rotation. This approach enables a more fine-grained analysis of the sensed magnetic field in sensing the direction of rotation. In addition, this approach can be used with only two, asymmetrically positioned magnets mounted to the wheel; for example, one magnet may be placed at zero degrees with its north pole pointed radially outward, and the second magnet may be positioned at a location between 30 degrees and 65 degrees, and more preferably between 40 degrees and 50 degrees, with its north pole pointed radially inward.

One problem with this approach is that the power consumption of commercially available TMR sensors 40 that output an analog signal is unacceptably high for many applications. To address this issue, a TMR sensor chip may be constructed that includes an analog buffer that can be turned off to reduce power. For example, a TMR sensor chip can be constructed by combing the functionality of a TMR switch chip (e.g., a digital output version of the Crocus CT83x) with a TMR sensor chip having an analog output buffer (e.g., the CT834) into a single chip having an extra pin for disabling the analog buffer. With such a combination, when the TMR switch triggers, the TMR sensor chip may enable its analog buffer, allowing the analog signal to be read by the controller 50. The controller 50 may then read the analog buffer (via an ADC) multiple times (e.g., twice) to determine whether the magnetic field is increasing or decreasing, and then may instruct the TMR senor chip to disable the analog buffer. The process for determining the direction of rotation may be similar to that of the preceding embodiment, except that with each interrupt (generated by a positive or negative transition of the two-level output) the controller would obtain multiple (e.g., 2) data values representing the strength of the sensed magnetic field. The controller 50 would thus be able to match the TMR sensor's output to one of the two expected patterns or waveforms (for clockwise and counterclockwise rotation, respectively) with greater accuracy. As a further enhancement, the combined digital/analog TMR sensor chip described above can be configured or designed (or instructed by the controller 50) to use a lower sampling rate when no transitions of the digital output are occurring, so that power consumption is reduced when the shopping cart is stationary.

In another embodiment of the invention, the magnets M1-M3 are replaced with conductive targets, and an eddy current sensor is used for the magnetic sensor 40. The Texas Instruments™ LDC0851 Differential Inductive Switch is one example of an eddy current sensor that can be used. The conductive targets may be arranged on the wheel using the same arrangements as described above such that they pass within the threshold distance specified for the particular eddy current sensor used. The conductive targets may be aluminum or another type of metal and may be coated with an anti-corrosive coating. As is known in the art, the eddy current sensor 40 includes a sense coil that generates an oscillating magnetic field. This magnetic field induces eddy currents in the conductive targets M1-M3 as they pass in close proximity to the eddy current sensor; this causes the amplitude of oscillation in the sense coil to decay faster than it would in the absence of a conductive target, allowing the eddy current sensor to sense the presence of a conductive target in close proximity. If three conductive targets M1-M3 arranged as in FIGS. 1 and 2 are used together with an eddy current sensor 40 that acts as a binary switch, the output of the eddy current sensor will be substantially the same as in FIG. 5. Thus, the algorithm used for sensing the direction of rotation may be the same as shown in FIG. 7 and described above.

The foregoing embodiments are intended to illustrate, and not limit, the invention. The scope of the invention is defined by the claims.

The following is claimed:

1. A wheel assembly comprising:

a wheel having mounted thereon a plurality of objects, said objects mounted in an angularly asymmetrical arrangement, wherein the number of said objects is at least three and the objects are arranged in an angularly asymmetric arrangement on the wheel to form at least three different angles of separation between adjacent objects;

a single magnetic sensor mounted to a non-rotating portion of the wheel assembly such that the objects pass by the single magnetic sensor as the wheel rotates, wherein the objects induce a response in the magnetic sensor as the wheel rotates, causing the magnetic sensor to generate a time varying output signal that differs, as a result of the angularly asymmetrical arrangement, depending upon whether the wheel is rotating in a clockwise versus counterclockwise direction; and a controller configured to determine the direction of rotation of the wheel based solely on the time varying output signal of the single magnetic sensor;

wherein the objects and the magnetic sensor are positioned substantially equidistant from a center of the wheel.

2. The wheel assembly of claim 1, wherein the objects are magnets, and the magnetic sensor is a tunneling magnetoresistance (TMR) sensor.

3. The wheel assembly of claim 1, wherein the objects are conductive targets, and the magnetic sensor is an eddy current sensor.

4. The wheel assembly of claim 1, wherein no two angles of separation between angularly adjacent objects are the same.

5. The wheel assembly of claim 1, wherein the objects are arranged to form at least three different angles of separation between angularly adjacent objects.

6. The wheel assembly of claim 1, wherein the wheel assembly is a non-castered shopping cart wheel assembly.

7. The wheel assembly of claim 1, wherein the magnetic sensor operates as a binary switch that switches between two output levels, and the controller is configured to determine the direction of rotation based on timings of transitions between the two output levels.

8. The wheel assembly of claim 7, wherein the controller is a microcontroller configured to generate an interrupt in response to transitions between the two output levels.

9. The wheel assembly of claim 1, wherein the magnetic sensor is not located in a plane in which the objects rotate.

10. A method of sensing a direction of rotation of a wheel of a wheel assembly, the wheel having a plurality of objects mounted thereon in an angularly asymmetrical arrangement, wherein the number of said objects is at least three, and the objects are arranged in an angularly asymmetric arrangement on the wheel to form at least three different angles of separation between adjacent objects, the method comprising:

generating, with a single magnetic sensor mounted to a non-rotating portion of the wheel assembly, a signal representing movement of the objects relative to the magnetic sensor as the wheel rotates, wherein the signal has a first pattern when the wheel rotates in a first direction, and has a second pattern that is different from the first pattern when the wheel rotates in a second direction, said different first and second patterns resulting from the angularly asymmetrical arrangement of the objects, wherein the magnetic sensor and the objects are positioned approximately equidistant from a center of the wheel; and by a controller coupled to the magnetic sensor, sensing said direction of rotation of the wheel by analyzing the pattern of said signal, whereby the controller senses the direction of rotation based solely on an output of the single magnetic sensor.

11. The method of claim 10, wherein the objects are magnets, and the magnetic sensor is a tunneling magnetoresistance (TMR) sensor.

12. The method of claim 10, wherein the objects are conductive targets, and the magnetic sensor is an eddy current sensor.

13. The method of claim 10, wherein no two angles of separation between angularly adjacent objects are the same.

14. The method of claim 10, wherein the wheel assembly is a non-castered shopping cart wheel assembly.

15. The method of claim 10, wherein the magnetic sensor operates as a binary switch that switches between two output levels, and the method comprises sensing the direction of rotation based on timings of transitions between the two output levels.

16. A wheel assembly comprising:

a wheel having mounted thereon a plurality of objects, said objects mounted in an angularly asymmetrical arrangement, wherein no two angles of separation between angularly adjacent objects are the same;

a single magnetic sensor mounted to a non-rotating portion of the wheel assembly such that the objects pass by the single magnetic sensor as the wheel rotates, wherein the objects induce a response in the magnetic sensor as the wheel rotates, causing the magnetic sensor to generate a time varying output signal that differs, as a result of the angularly asymmetrical arrangement, depending upon whether the wheel is rotating in a clockwise versus counterclockwise direction; and a controller configured to determine the direction of rotation of the wheel based solely on the time varying output signal of the single magnetic sensor;

wherein the objects and the magnetic sensor are positioned substantially equidistant from a center of the wheel.

17. A wheel assembly comprising:

a wheel having mounted thereon a plurality of objects, said objects mounted in an angularly asymmetrical arrangement such that the objects form at least three different angles of separation between angularly adjacent objects;

a single magnetic sensor mounted to a non-rotating portion of the wheel assembly such that the objects pass by the single magnetic sensor as the wheel rotates, wherein the objects induce a response in the magnetic sensor as the wheel rotates, causing the magnetic sensor to generate a time varying output signal that differs, as a result of the angularly asymmetrical arrangement, depending upon whether the wheel is rotating in a clockwise versus counterclockwise direction; and a controller configured to determine the direction of rotation of the wheel based solely on the time varying output signal of the single magnetic sensor;

wherein the objects and the magnetic sensor are positioned substantially equidistant from a center of the wheel.

18. A method of sensing a direction of rotation of a wheel of a wheel assembly, the wheel having a plurality of objects mounted thereon in an angularly asymmetrical arrangement, wherein no two angles of separation between angularly adjacent objects are the same, the method comprising:

generating, with a single magnetic sensor mounted to a non-rotating portion of the wheel assembly, a signal representing movement of the objects relative to the magnetic sensor as the wheel rotates, wherein the signal has a first pattern when the wheel rotates in a first direction, and has a second pattern that is different from the first pattern when the wheel rotates in a second direction, said different first and second patterns resulting from the angularly asymmetrical arrangement of the objects, wherein the magnetic sensor and the objects are positioned approximately equidistant from a center of the wheel; and by a controller coupled to the magnetic sensor, sensing said direction of rotation of the wheel by analyzing the pattern of said signal, whereby the controller senses the direction of rotation based solely on an output of the single magnetic sensor.

\*   \*   \*   \*   \*